US012335346B2

(12) United States Patent
Nesargi et al.

(10) Patent No.: US 12,335,346 B2
(45) Date of Patent: *Jun. 17, 2025

(54) SMART FORMS FOR AUTOMATED CONFIGURATION OF SOLUTIONS

(71) Applicant: Fidelity Information Services, LLC, Jacksonville, FL (US)

(72) Inventors: Susheel Nesargi, Saint Johns, FL (US); David Berglund, Ponte Vedra, FL (US); Glen Casey, Quinton, AL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,677

(22) Filed: May 2, 2023

(65) Prior Publication Data

US 2023/0275970 A1    Aug. 31, 2023

Related U.S. Application Data

(63) Continuation of application No. 17/393,260, filed on Aug. 3, 2021, now Pat. No. 11,683,385.

(51) Int. Cl.
*G06F 21/60* (2013.01)
*G06F 3/0482* (2013.01)
(Continued)

(52) U.S. Cl.
CPC ........... *H04L 67/34* (2013.01); *G06F 3/0482* (2013.01); *G06Q 10/0633* (2013.01); *H04L 67/06* (2013.01); *H04L 67/08* (2013.01)

(58) Field of Classification Search
CPC ....... G06F 16/22; G06F 16/337; H04L 63/08; H04L 65/1063
See application file for complete search history.

(56) References Cited

U.S. PATENT DOCUMENTS 6,327,624 B1 * 12/2001 Mathewson, II ......... G06F 8/76
 709/227
6,415,284 B1   7/2002 D'Souza et al.
(Continued)

FOREIGN PATENT DOCUMENTS

WO    0101284 A2    1/2001
WO    0140963 A1    6/2001

OTHER PUBLICATIONS

Bob Arnold-Sybase: "Accountworks: Users Create Accounts on SQL, Notes, NT, and UNIX", USENIX, USENIX, the Advanced Computing Systems Association, Dec. 11, 1998 (Dec. 11, 1998), pp. 1-15, XP061012207, [retrieved on Dec. 11, 1998].

(Continued)

*Primary Examiner* — Nicholas R Taylor
*Assistant Examiner* — Ho T Shiu
(74) *Attorney, Agent, or Firm* — Bookoff McAndrews, PLLC

(57) ABSTRACT

A smart forms solution that enables transactions institutions to provide configuration parameters in a streamlined manner so that developers can construct end-to-end solutions in an automated manner includes performing, by a processor, operations including: receiving data from a form in a webpage; validating the received data; saving the validated data; determining a location to send the saved data; sending the saved data to the determined location; invoking an API at the determined location with the saved data; and using the saved data to perform a manual operation.

20 Claims, 10 Drawing Sheets

(51) Int. Cl.
  *G06Q 10/0633*  (2023.01)
  *H04L 9/32*    (2006.01)
  *H04L 67/00*   (2022.01)
  *H04L 67/06*   (2022.01)
  *H04L 67/08*   (2022.01)

(56) References Cited

U.S. PATENT DOCUMENTS

| | | | |
|---|---|---|---|
| 6,625,649 B1* | 9/2003 | D'Souza | G06F 3/0219 |
| | | | 709/225 |
| 2010/0162147 A1* | 6/2010 | Ritter | G06Q 10/00 |
| | | | 715/764 |
| 2014/0129611 A1 | 5/2014 | Norris et al. | |
| 2017/0277774 A1* | 9/2017 | Eigner | G06Q 30/0204 |
| 2018/0157685 A1 | 6/2018 | Flerl et al. | |
| 2021/0042126 A1* | 2/2021 | Perera | G06F 11/0772 |
| 2021/0044637 A1* | 2/2021 | Lee | H04L 65/4025 |
| 2021/0174302 A1 | 6/2021 | Brahmbhatt et al. | |

OTHER PUBLICATIONS

Servicenow: "ServiceNow Cloud Management: Accelerating and Strengthening Cloud Development and Operations", Nov. 1, 2016 (Nov. 1, 2016), XP055556903, Retrieved from the Internet: URL:https://www.servicenow.com/content/dam/servicenow-assets/public/en-us/doc-type/resource-center/white-paper/servicenow-cloud-management-accelerating-and-strengthening-cloud-development.pdf [retrieved on Feb. 14, 2019].
Communication pursuant to Article 94(3) EPC issued in European Application No. 22769857.8 mailed on Aug. 2, 2024 (5 pages).

* cited by examiner

GENERAL INFORMATION

STATUS: NEW FORM

PROGRESS: 0% (0/17)

SECTION 01 - GENERAL INFORMATION

1 - BANK NAME
PLEASE ENTER A BANK NAME

2 - MAILING ADDRESS
STREET ADDRESS 1
STREET ADDRESS 2
CITY
STATE
ENTER YOUR 5 DIGIT ZIP CODE

3 - PHYSICAL ADDRESS  ☐ SAME AS MAILING ADDRESS
STREET ADDRESS 1
STREET ADDRESS 2
CITY
STATE
ENTER YOUR 5 DIGITL ZIP CODE

4 - BANK'S PRIMARY PHONE NUMBER
ENTER YOUR 10 DIGIT PHONE NUMBER

5 - ABA/TRANSIT
ENTER YOUR 9 DIGIT ABA/TRANSIT NUMBER

6 - TIN #
ENTER YOUR 9 DIGIT TIN

SMART FORMS FOR AUTOMATED CONFIGURATION OF SOLUTIONS

CROSS-REFERENCE TO RELATED APPLICATION(S)

This patent application is a continuation of and claims the benefit of priority to U.S. application Ser. No. 17/393,260, filed on Aug. 3, 2021, the entirety of which is incorporated herein by reference.

TECHNICAL FIELD

Various embodiments of the present disclosure relate generally to smart forms and, more particularly, to a smart forms solution that enables transactions institutions, for example, to provide configuration parameters in a streamlined manner so that developers can construct end-to-end solutions in an automated manner.

BACKGROUND

Implementations of solutions for clients within banking, payments, and other areas tend to be quite complex. These solutions typically involve multiple products/platforms with several upstream and downstream integrations. One of the primary steps for setting up these systems involves receiving configuration parameters from end clients. Currently, most implementation teams use offline forms/surveys/questionnaires for receiving configuration parameters from end clients, using documents or worksheets, for example.

However, offline forms/surveys/questionnaires lead to challenges with incomplete, invalid, or missing data, which in turn leads to significant back-and-forth with clients and redundancy in data requests to clients. Additionally, most implementation teams have a completely manual process for configuring platforms/solutions in most cases. Currently, the process of configuring an end-to-end solution for clients is very manual, involving multiple offline forms and largely dependent on individuals within multiple implementations teams.

The present disclosure is directed to overcoming one or more of these above-referenced challenges.

SUMMARY OF THE DISCLOSURE

According to certain aspects of the disclosure, systems and methods are disclosed for providing configuration parameters in a streamlined manner so that developers can construct end-to-end solutions in an automated manner.

In accordance with an embodiment, a method comprises performing, by a processor, operations including: receiving data from a form in a webpage; validating the received data; saving the validated data; determining a location to send the saved data; sending the saved data to the determined location; invoking an API at the determined location with the saved data; and using the saved data to perform a manual operation.

In accordance with an embodiment, a system comprises a memory to store instructions; and a processor to execute the stored instructions to perform operations including: receiving data from a form in a webpage; validating the received data; saving the validated data; determining a location to send the saved data; sending the saved data to the determined location; invoking an API at the determined location with the saved data; and using the saved data to perform a manual operation.

In accordance with an embodiment, a non-transitory computer-readable medium stores instructions that, when executed by a processor, perform operations including: receiving data from a form in a webpage; validating the received data; saving the validated data; determining a location to send the saved data; sending the saved data to the determined location; invoking an API at the determined location with the saved data; and using the saved data to perform a manual operation.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts an exemplary form in Portable Document Format, according to one or more embodiments.

FIG. 6 depicts an exemplary form implemented as a Smart Form, according to one or more embodiments.

DETAILED DESCRIPTION OF EMBODIMENTS

Figure 1:
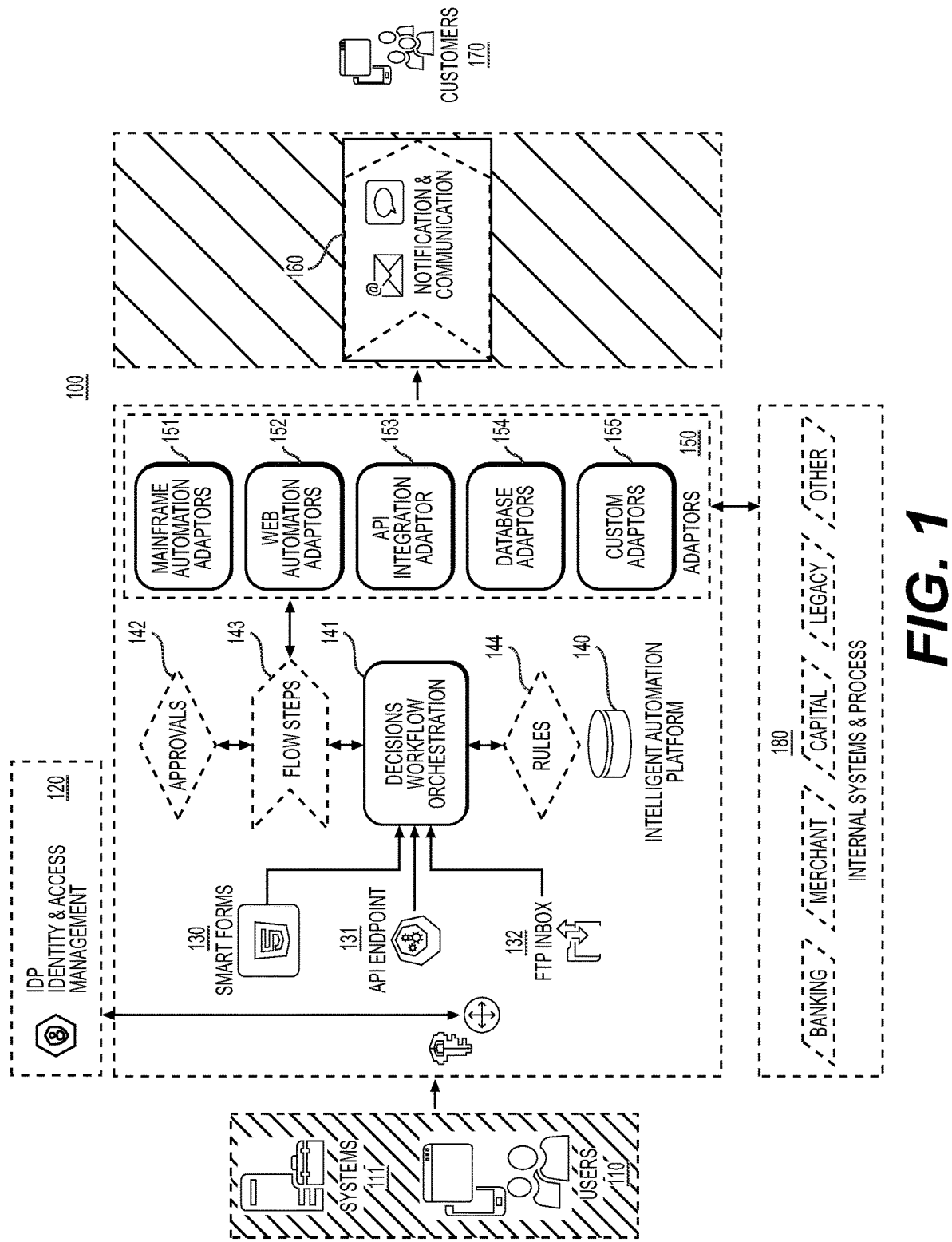
FIG. 1 depicts an exemplary system logical architecture, according to one or more embodiments.

Various embodiments of the present disclosure relate generally to smart forms and, more particularly, to a smart forms solution that enables large as well as mid-tier transactions (e.g., financial) institutions to provide configuration parameters in a streamlined manner so that developers can construct end-to-end solutions in an automated manner.

As described above, implementations teams may use offline forms to capture configuration parameters for solutions. Using offline forms may result in several challenges, such as incomplete, invalid, or missing data, with no data validation, significant back-and-forth with clients resulting in delayed projects, redundancy in data requests to the client which causes frustration, and using a completely manual process for configuring forms.

The disclosed embodiments may provide web-based forms that are delivered rapidly (in weeks, for example), may provide upfront data validation which ensures structured data, may provide downstream automation flows using a low or no code approach, and may provide a significantly enhanced and modern user experience.

The disclosed embodiments may provide accelerated delivery of implementations projects, a significant reduction in manual intervention, a major improvement in client experience, and reduced errors during solution configuration.

Smart Forms are web-based forms that are delivered rapidly. Upfront validation of data at various levels ensures capturing of structured data. There is also a significant degree of focus on creating a significantly enhanced user experience. Additionally, having downstream automation workflows using a low/no code approach significantly reduces manual effort in configuration of systems as well as the possibility of errors during configuration. This is a key aspect that allows for configuration of platforms that use both modern and legacy technologies.

Smart Forms provide the ability to have validated data made available for configuration of systems during implementation, and provide a seamless mechanism for automating configuration of both legacy and modern platforms.

The Smart Forms platform enables creation of a single entry point for end-to-end configuration of platform solutions for end clients in a core banking platform, in the payments space, or in other areas. The ability to have granular data validation take place upfront, combined with downstream automation with both legacy and modern platforms creates an extremely powerful construct for institutional clients requiring more custom or white glove solutions, and for clients that have more standardized out-of-the-box solutions.

The Smart Forms platform allows accelerated delivery of solutions projects, resulting in significant benefits while providing the ability to increase throughput for developers. The Smart Forms platform provides a significant reduction in manual intervention and hence potential for errors during configuration. The Smart Forms platform provides a major improvement in end-to-end client experience, and enables developers to obtain configuration parameters for solutions in a streamlined manner and use the structured, validated data for automated configuration.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

The systems depicted in the appended figures and described in the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

FIG. 1 depicts an exemplary system logical architecture, according to one or more embodiments.

As shown in FIG. 1, Smart Forms system 100 may include several components. In the exemplary system logical architecture of Smart Forms system 100, users 110 and systems 111 are secured using Identity Provider (IDP) and authenticated by a password and one-time-pin generated by an out-of-band authenticator 120 for their authorized access roles, users 110 access smart forms and are presented with a role based form 130 to enter data, systems 111 interact with an intelligent platform 140 using API access points 131 and FTP inbox location 132, and all automation is coordinated using decisions workflow orchestration 141. Decisions use predefined approvals 142, workflow steps 143, and rules 144 components, and interact with subsystems 180 using adaptors 150. Subsystems 180 may include banking, merchant, capital, legacy or other systems, for example. Adaptors 150 may include, for example, Mainframe Automation Adaptors 151, Web Automation Adaptors 152, API integration adaptors 153, database adaptors 154, and other custom adaptors 155. Workflow steps 143 can capture user role and approval interactions, and notification and communication component 160 handles communications with customers 170.

Figure 2:
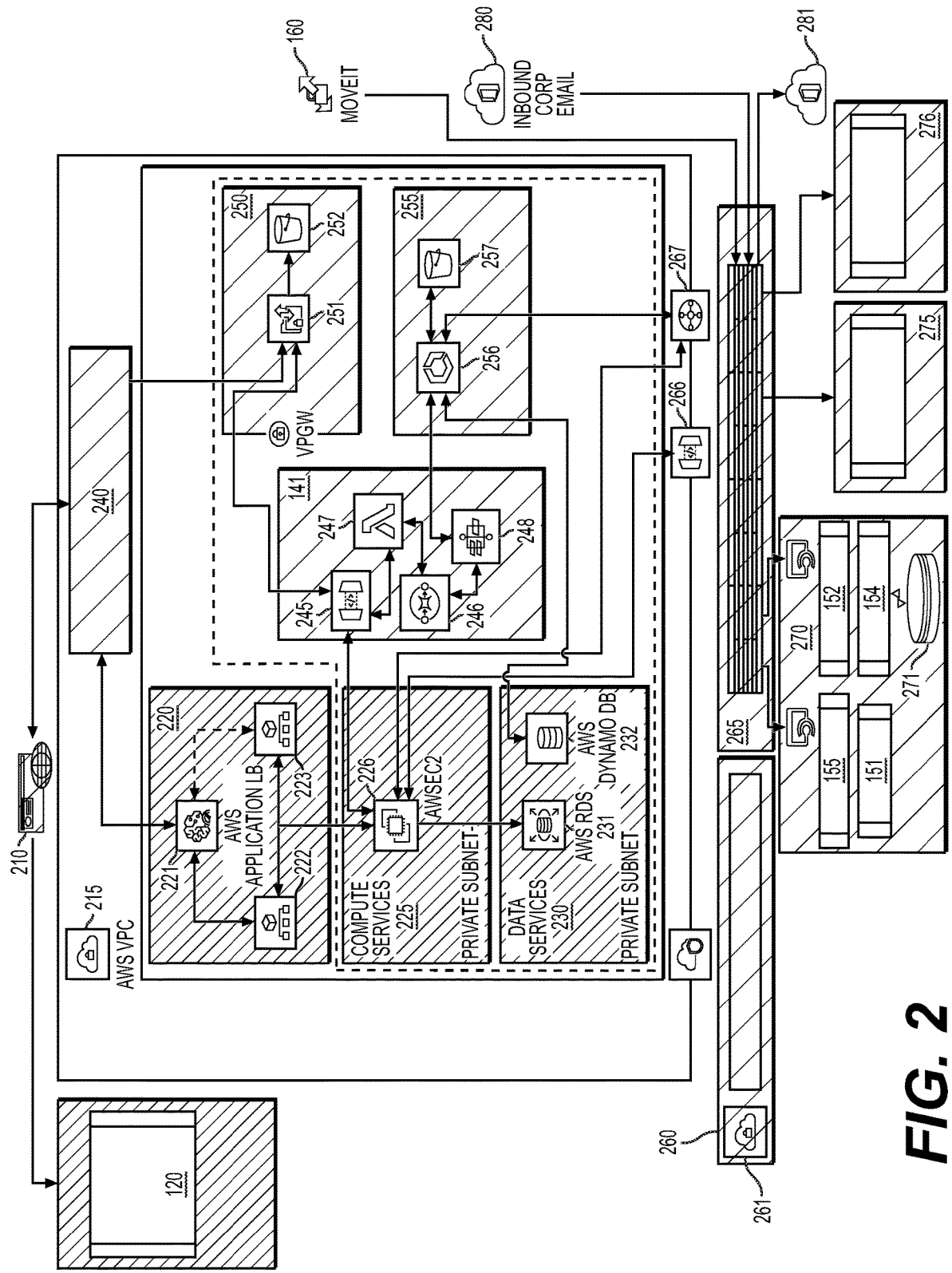
FIG. 2 depicts an exemplary system infrastructure including a cloud deployment, according to one or more embodiments.

FIG. 2 depicts an exemplary system infrastructure including a cloud deployment, according to one or more embodiments.

Although FIG. 2 illustrates Amazon Web Services (AWS) as an example of a cloud provider, the disclosure is not limited thereto.

As shown in FIG. 2, an exemplary system infrastructure including a cloud deployment implemented in AWS Virtual Private Cloud (VPC) 215 may include Identity and Authentication Management (IDP) 120 connected to a User Browser element 210 connected to Internet Gateway Secure Sockets Layer (SSL) 240 connected to Public Subnet 220. Public subnet 220 may include AWS Application Load Balancer 221, AWS Target Groups 222 and 223. Public subnet 220 may be connected to AWS Compute Services 225. AWS Compute Services 225 may include Decisions Workflow Orchestration 226 and be connected to AWS data services 230, which may include AWS Relational Database Service (RDS) 231 and AWS DynamoDB 232. AWS compute services 225 may also be connected to API Gateway 266 as part of a production firewall 265.

AWS compute services 225 may be connected to AWS Orchestration Services 141 and may include an AWS API Gateway 245, AWS Simple Queue Service 246, AWS Lambda 247, and AWS Simple Workflow 248. AWS Orchestration Services 141 may be connected to File Transfer Services 250, which may include AWS Secure Shell File Transfer Protocol 251 and AWS Simple Storage Service (S3) 252. Internet Gateway SSL 240 may also be connected to File Transfer Services 250. AWS Orchestration Services 141 may also be connected to Container services 255, which may include AWS Elastic Container Service (ECS) 256 and AWS S3 257.

Container services 255 may also be connected to AWS Transit Gateway (TGW) 267 as another part of production firewall 265, which may also be connected to AWS compute services 225. The system infrastructure may also include AWS VPN 260 including monitoring services, patching, and backups, and AWS Virtual Private Cloud (VPC) 261.

Production firewall 265 may be connected to Automation Services 270 including Mainframe Automation Adaptors 151 and Web Automation Adaptors 152. Mainframe Automation Adaptors 151 may be connected to custom adaptors 155. Web Automation Adaptors 152 may be connected to Web Automation Services 154, which may include database adaptors 154 and Database Components which may include SQL Server 271. Production firewall 265 may be connected to ServiceNow 275 and JIRA 276. Production firewall 265 may be connected to inbound email service 280, outbound email service 281, and notification and communication component 160 (e.g. MOVEit SFTP).

The exemplary system infrastructure provided above may provide a deployment in the public cloud (such as AWS, for example) which provides a high degree of scalability and elasticity, may provide integration with IdP for authentication and entitlements, and may provide a robust architecture with focus on performance and data security.

Figure 3:
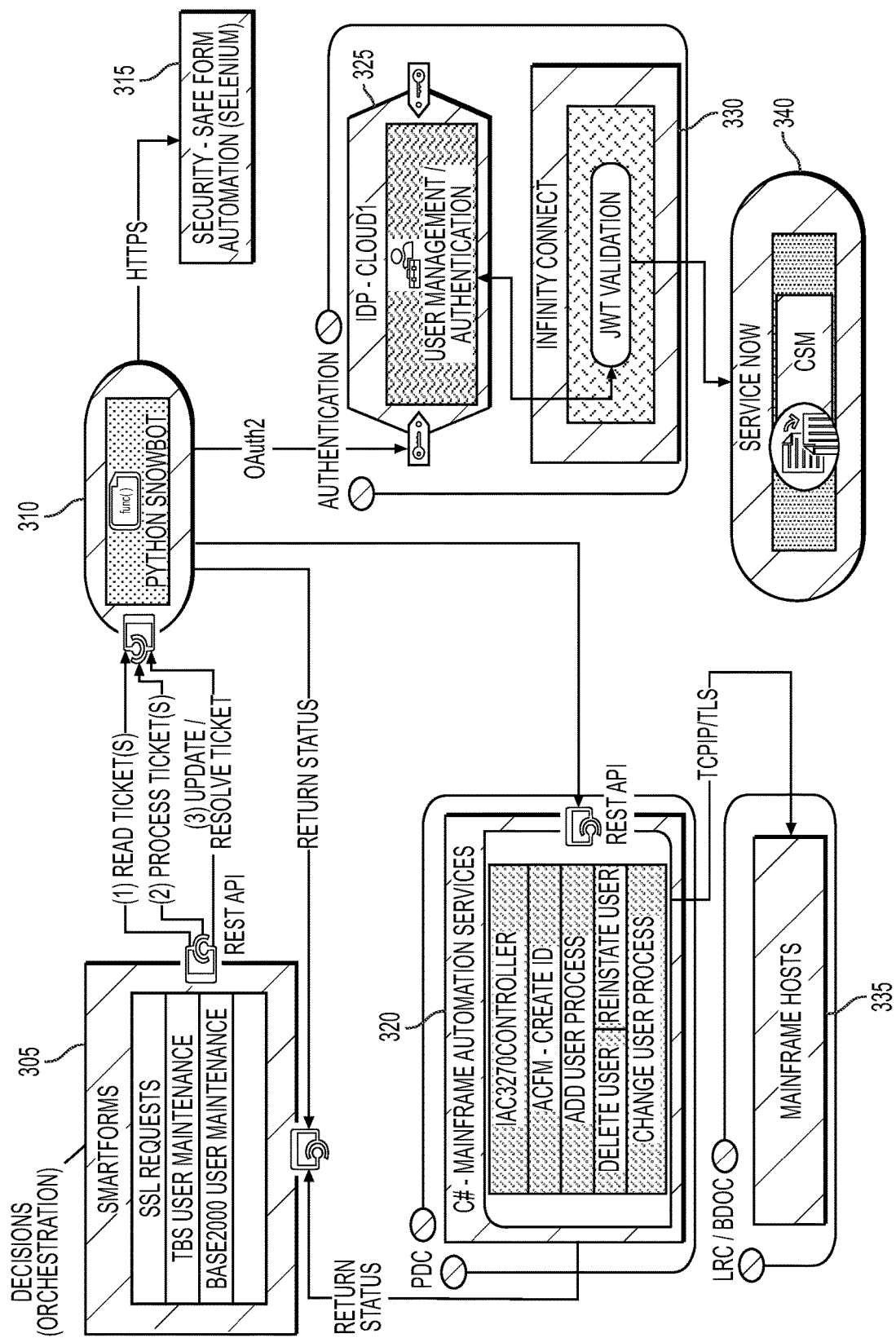
FIG. 3 depicts an exemplary system infrastructure for a mainframe automation service, according to one or more embodiments.

FIG. 3 depicts an exemplary system infrastructure for a mainframe automation service, according to one or more embodiments.

As an example in FIG. 1, a user 110 accesses a SmartForms URL and is redirected to Identity and Access Management 120 and is authenticated by a password and one-time pin. Upon successful authentication, the user is redirected to SmartForms 130 where the user enters data that is validated in real-time and persisted by Intelligent Automation Platform 140. Decisions Workflow Orchestration 141 initiates Web Automation Adaptors 152 and creates tickets and performs automation in Internal Systems and Process 180.

As an example in FIG. 2, a user, through User Browser element 210, may access a SmartForms URL thru an AWS Internet Gateway 240 which is connected to an AWS Application Load Balancer 221, which is connected to an AWS Target Group 222, which is connected to an AWS Compute Resource 226, which may include a Decisions Workflow Orchestration component. A user may be presented with a SmartForm whereby data is collected and validated in real time. When a user initiates an action, such as clicking a button in the form, the Decisions Workflow Orchestration may initiate an API call thru an AWS API gateway 266 which is connected to a production firewall 265, which initiates a connection to Automation Services 270. Automation Services 270 performs backend automation that may create a ServiceNow ticket, for example.

As an example in FIG. 3, an automation flow first makes an API call into ServiceNow in SmartForms 305 to retrieve a list of tickets created by users using the SmartForm user interface. The ticket details are then processed and transitioned over to the python service layer 310 (the python snowbot), which performs further data validation and initiates browser automation to back end systems 315. OAuth2 authentication component 325 and 330 authenticate the request, and based on this, first acknowledge the ticket using an API call into ServiceNow 340. Then, if the request is regarding user administration (to add/delete/reinstate a user, for example), python service layer 310 invokes the API in mainframe automation services 320 for the mainframe automation adapter/component with the correct set of parameters framed using information within the ticket to implement in mainframe hosts 335. Once this is executed successfully, an email is sent to the individual requesting the ticket and a ServiceNow API is invoked to update/close the ticket. A status is returned to the SmartForm component 305 to indicate the results of the operation.

Figure 4:
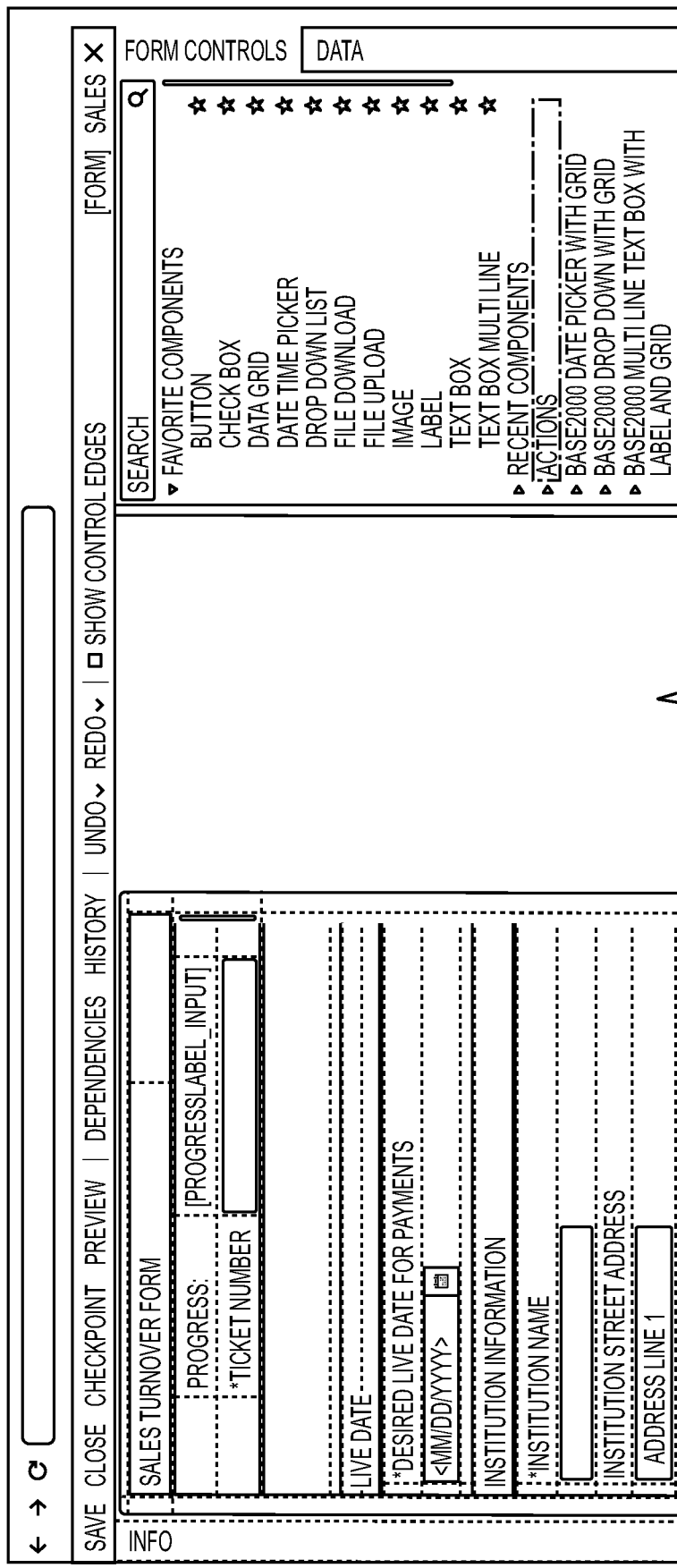
FIG. 4 depicts an exemplary system smart form designer, according to one or more embodiments.
Figure 4:
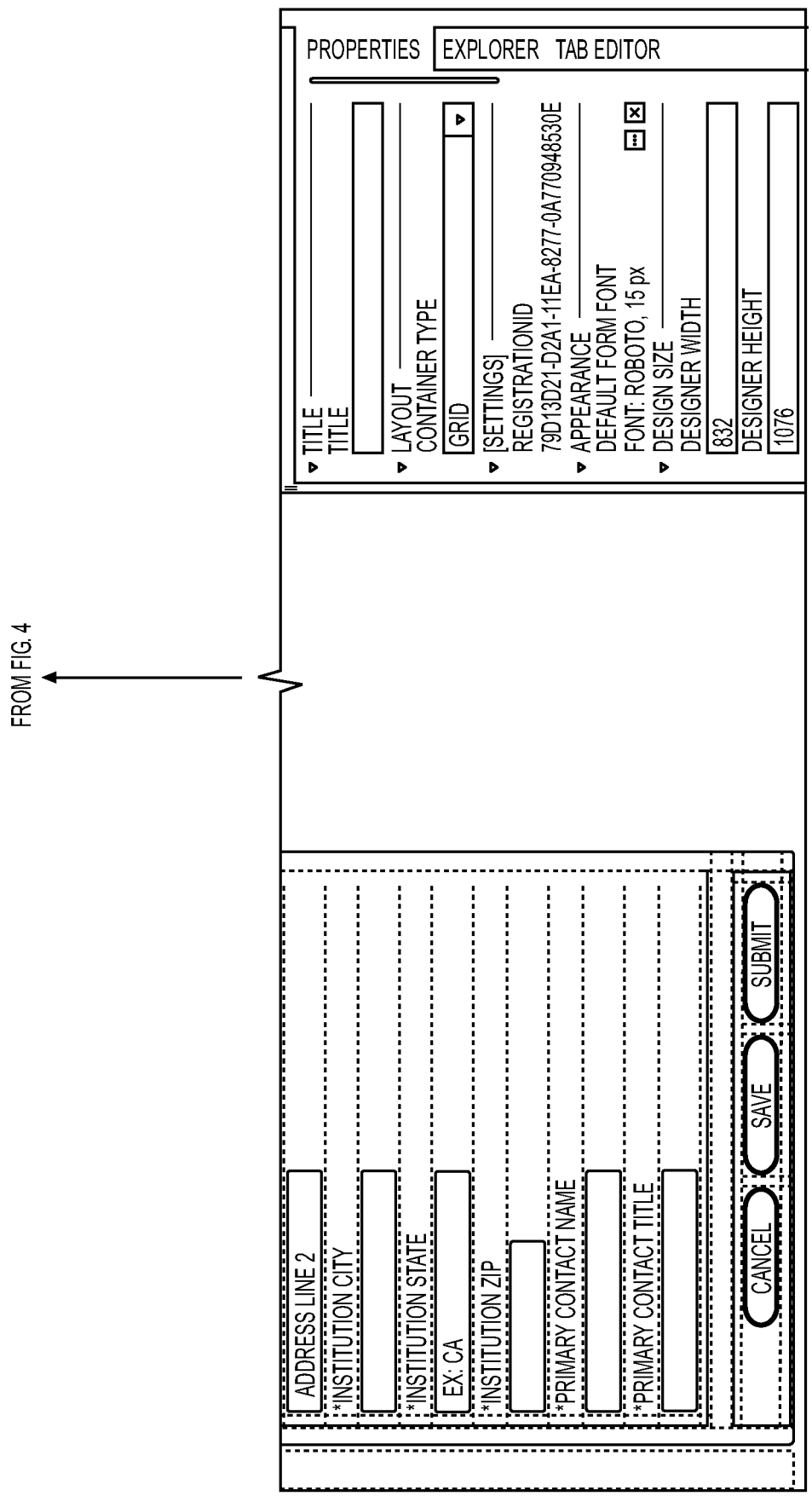

FIG. 4 depicts an exemplary system smart form designer, according to one or more embodiments.

As shown in FIG. 4, an example smart form 400 may be designed in a web interface, and may include, for example, fields such as a desired live date for payments, institution name, street address, city, state, and zip, and primary contact name and title.

Smart form 400 may provide a hyper-simplified approach to form design and development, provide complex data validations built in at various levels, provide standards for branding, and may focus on user experience and usability.

Figure 5:
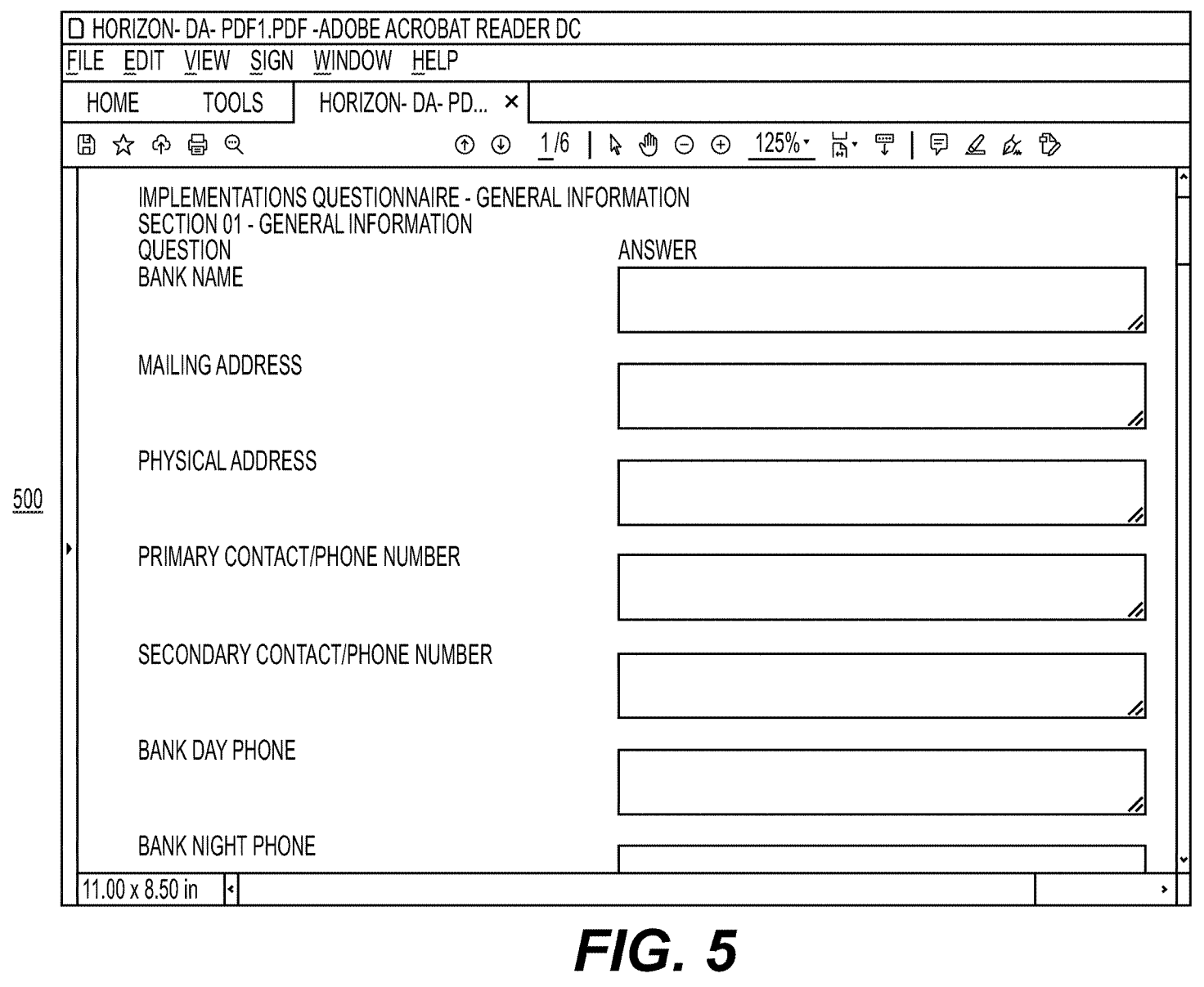

FIG. 5 depicts an exemplary form in Portable Document Format, according to one or more embodiments.

As shown in FIG. 5, an exemplary .pdf form 500 may include a .pdf document with text boxes to enter information such as name, mailing address, physical address, primary contact, secondary contact, day phone number, and night phone number. Although FIG. 5 illustrates a .pdf form, other non-web-fillable formats such as Microsoft Word or Excel documents may be considered as equivalent forms to that of FIG. 5.

FIG. 6 depicts an exemplary form implemented as a Smart Form, according to one or more embodiments.

As shown in FIG. 6, an exemplary Smart Form 600 may be implemented as a web-fillable form and include text boxes to enter information such as name, mailing address, physical address, primary contact, transit number, and TIN, for example.

Smart Form 600 may use data validation to reduce errors, provide a consistent user experience across all products, provide a high focus on usability to enable ease of data entry, and may use data pulled from source systems to reduce manual entry.

Figure 7:
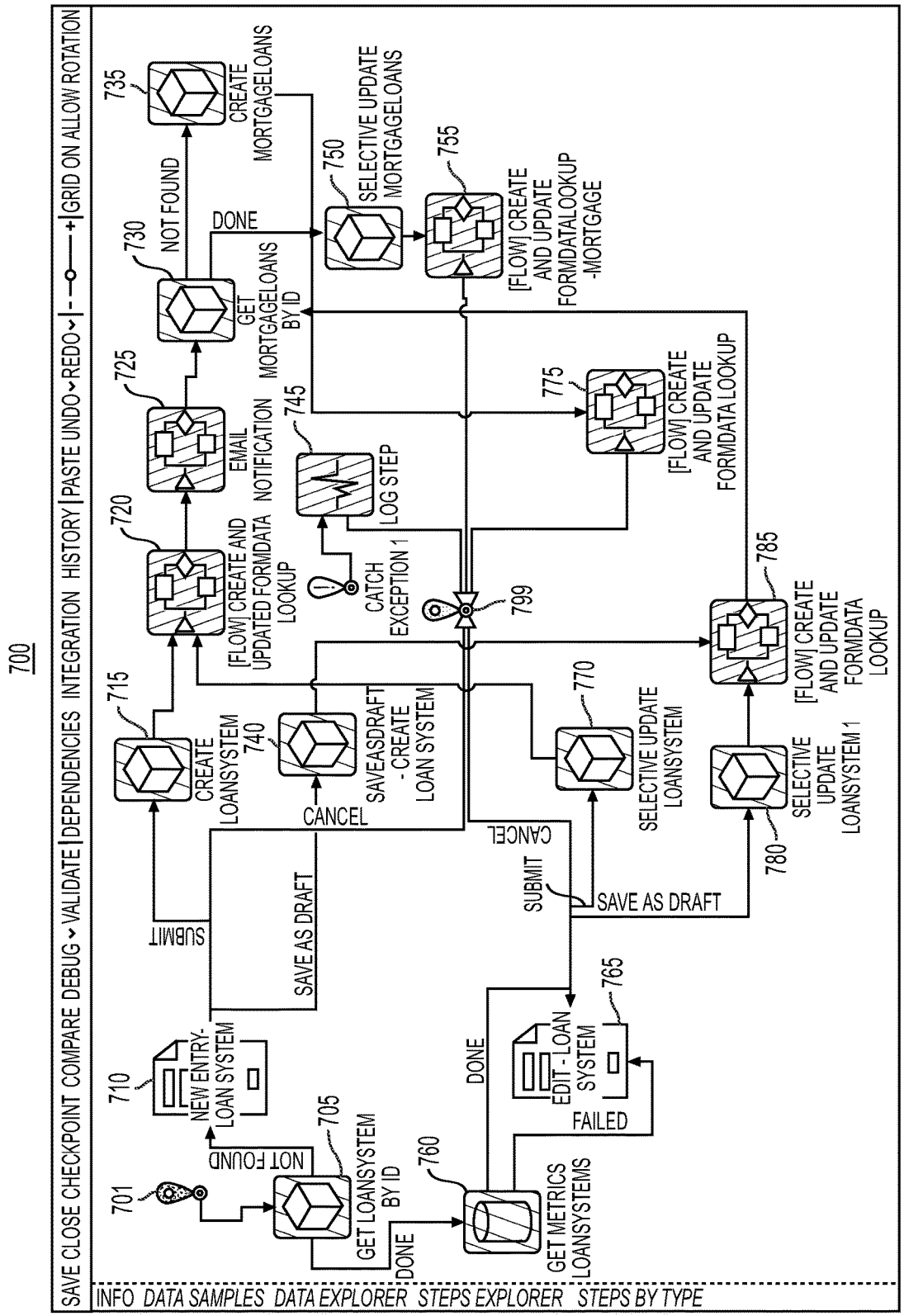
FIG. 7 depicts an exemplary workflow, according to one or more embodiments.

FIG. 7 depicts an exemplary workflow, according to one or more embodiments.

As shown in FIG. 7, one SmartForm and workflow orchestration 700 with regards to a Loan System processing may begin at point 701 and terminate at point 799. workflow orchestration 700 may include components a fetch entity get_loan_system_by_id 705, a web form defined as a new_entry 710, a database persist object create_loan_system 715, a database persist object and lookup list defined in subflow create_form_data_lookup 720, user email_notification 725, a fetch entity get_mortgage_loans_by_id 730, a database persist object create_mortgage_loans 735, a database persist object save_as_draft 740, a log_step 745, a database persist object selective_update 750, a web form defined as create_form_data_lookup 755, a javascript component known as get_metrics 760, a web form defined as edit_loan_system 765, a database persist object selective_update 770, a database persist object and subflown known as create_form_data_lookup 775, a database persist object selective_update 780, and a database persist object create_form_data_lookup 785. The components listed above may be arranged and connected as illustrated in FIG. 7.

The workflow orchestration 700 may provide highly flexible workflows that enable end-to-end automation and integration to other systems, along with a low-code/no-code approach that reduces solution footprint and dependency on developers.

Figure 8:
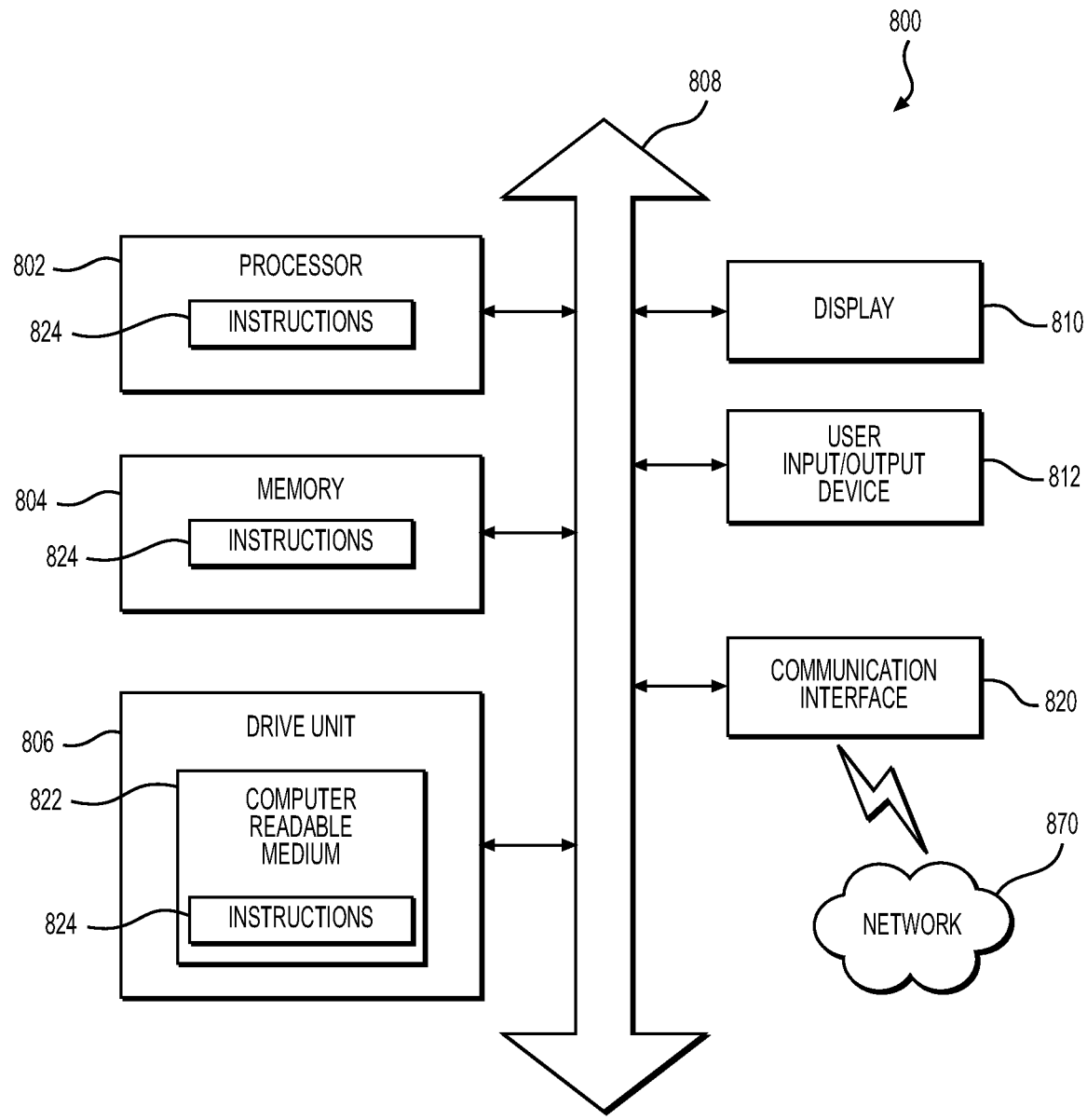
FIG. 8 illustrates an implementation of a general computer system that may execute techniques presented herein.

FIG. 8 illustrates an implementation of a general computer system that may execute techniques presented herein.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 8 illustrates an implementation of a computer system 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while a computer system 800 is illustrated as a single system, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like.

In one implementation, the memory 804 includes a cache or random-access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the processor 802 executing the instructions stored in the memory 804. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 800 may further include a display 810, such as a liquid crystal display (LCD), an organic light emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input device 812 configured to allow a user to interact with any of the components of computer system 800. The input device 812 may be a number pad, a keyboard, or a cursor control device, such as a mouse, or a joystick, touch screen display, remote control, or any other device operative to interact with the computer system 800.

The computer system 800 may also or alternatively include drive unit 806 implemented as a disk or optical drive. The drive unit 806 may include a computer-readable medium 822 in which one or more sets of instructions 824, e.g. software, can be embedded. Further, the instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 870 can communicate voice, video, audio, images, or any other data over the network 870. Further, the instructions 824 may be transmitted or received over the network 870 via a communication port or interface 820, and/or using a bus 808. The communication port or interface 820 may be a part of the processor 802 or may be a separate component. The communication port or interface 820 may be created in software or may be a physical connection in hardware. The communication port or interface 820 may be configured to connect with a network 870, external media, the display 810, or any other components in computer system 800, or combinations thereof. The connection with the network 870 may be a physical connection, such as a wired Ethernet connection or may be established wirelessly as discussed below. Likewise, the additional connections with other components of the computer system 800 may be physical connections or may be established wirelessly. The network 870 may alternatively be directly connected to a bus 808.

While the computer-readable medium 822 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 822 may be non-transitory, and may be tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to a network 870. The network 870 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 870 may include wide area networks (WAN), such as the Internet, local area networks (LAN), campus area networks, metropolitan area networks, a direct connection such as through a Universal Serial Bus (USB) port, or any other networks that may allow for data communication. The network 870 may be configured to couple one computing device to another computing device to enable communication of data between the devices. The network 870 may generally be enabled to employ any form of machine-readable media for communicating information from one device to another. The network 870 may include communication methods by which information may travel between computing devices. The network 870 may be divided into sub-networks. The sub-networks may allow access to all of the other components connected thereto or the sub-networks may restrict access between the components. The network 870 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 9:
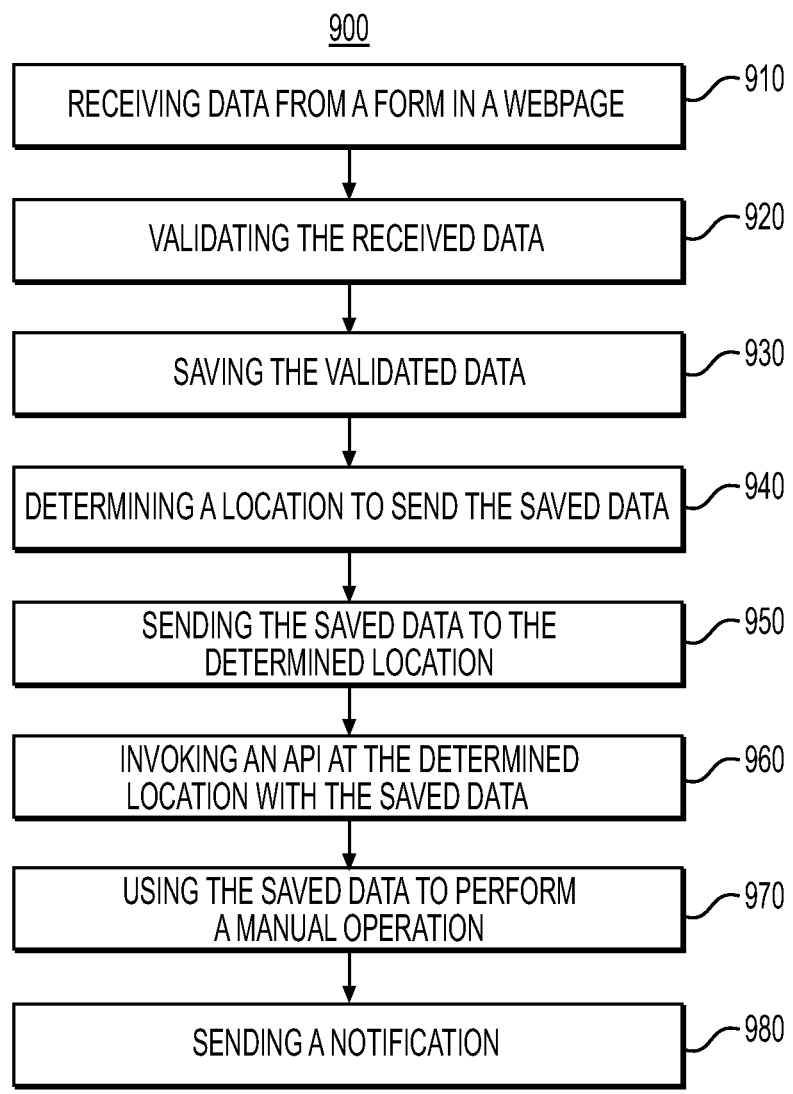
FIG. 9 depicts an exemplary method, according to one or more embodiments.

FIG. 9 depicts an exemplary method, according to one or more embodiments.

As shown in FIG. 9, a method 900 may include performing, by a processor, operations including collecting data from a user interacting with a form in a webpage in operation 910, data validation rules applied in operation 920, workflow orchestration determining a location to persist the data in in operation 940, persisting the data in operation 950, invoking an API in operation 960, using open source components written in Selenium Python, for example, in operation 970 and then sending a user notification in operation 980. The operations may include validating the received data (operation 920), and saving the validated data (operation 930), for example, in an Extensible Markup Language (.xml) file.

Further details of the method may include determining a location to send the saved data (operation 940), which may include, for example, acknowledging a ticket raised by a requestor, determining whether the ticket is associated with user administration including one or more of adding, deleting, or reinstating a user, and determining the determined location as a mainframe.

Further details of the operations may include sending the saved data to the determined location (operation 950), invoking an API at the determined location with the saved data (operation 960), and using the saved data, for example, using an open source 3270 terminal emulator, to perform a manual operation (operation 970). The API may be a Representational state transfer (REST) API used for sending parameters. The saved data may be provided to the API using a JavaScript Object Notation (JSON) format. The saved data may define an operation that a human user would use to perform the manual operation, and may contain data that would otherwise be entered manually while performing the manual operation. The manual operation may include logging into an application, navigating through specific screens via one or more of a mouse click or a keystroke, and entering the saved data into an area of functionality of the application.

The operations may include sending a notification (operation 980) to the requestor that the ticket has been processed, and closing the ticket.

It should be appreciated that in the above description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosure.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as falling within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method comprising:
performing, by one or more processors, operations including:
initiating, by a decisions workflow component, an API call through an API gateway connected to a production firewall to initiate a connection to an automation services component to process saved data, wherein the saved data has been validated;
validating, by a service layer, the saved data;
creating, by the automation services component using backend automation, a service ticket in a digital workflow component using the saved data;
authenticating, by a service layer, the service ticket;
determining, by the digital workflow component, based on the saved data and the service ticket, a location to send the saved data, wherein the determining the location to send the saved data includes determining whether the service ticket is associated with one or more of adding, deleting, or reinstating a user;
sending, by the digital workflow component, the saved data from the service ticket to the determined location; and
using, by a terminal emulator, the saved data from the service ticket to automatically perform a manual operation that changes a component at the determined location.

2. The method of claim 1, wherein the data is saved in an .xml file.

3. The method of claim 1, wherein the API is a Representational state transfer (REST) API used for sending parameters.

4. The method of claim 1, wherein the saved data is provided to the API using a JavaScript Object Notation (JSON) format.

5. The method of claim 1, wherein the saved data defines an operation that a human user would use to perform the manual operation, and contains data that would otherwise be entered manually while performing the manual operation.

6. The method of claim 1, wherein the using the saved data to perform a manual operation includes using an open source 3270 terminal emulator.

7. The method of claim 1, wherein the operations further include:
receiving data from a form in a webpage;
validating the received data; and
saving the validated data as the saved data.

8. The method of claim 1, wherein the manual operation includes logging into an application, navigating through specific screens via one or more of a mouse click or a keystroke, and entering the saved data into an area of functionality of the application.

9. The method of claim 1,
wherein the determining the location to send the saved data includes acknowledging the service ticket and determining the determined location as a mainframe.

10. The method of claim 1, wherein the operations further include:
sending a notification that the service ticket has been processed, and closing the service ticket.

11. A system comprising:
a memory to store instructions; and
one or more processors to execute the stored instructions to perform operations including:
initiating, by a decisions workflow component, an API call through an API gateway connected to a production firewall to initiate a connection to an automation services component to process saved data, wherein the saved data has been validated;
validating, by a service layer, the saved data;
creating, by the automation services component using backend automation, a service ticket in a digital workflow component using the saved data;
authenticating, by a service layer, the service ticket;
determining, by the digital workflow component, based on the saved data and the service ticket, a location to send the saved data, wherein the determining the location to send the saved data includes determining whether the ticket is associated with one or more of adding, deleting, or reinstating a user;
sending, by the digital workflow component, the saved data from the service ticket to the determined location; and
using, by a terminal emulator, the saved data from the service ticket to automatically perform a manual operation that changes a component at the determined location.

12. The system of claim 11, wherein the data is saved in an .xml file.

13. The system of claim 11, wherein the API is a Representational state transfer (REST) API used for sending parameters.

14. The system of claim 11, wherein the saved data is provided to the API using a JavaScript Object Notation (JSON) format.

15. The system of claim 11, wherein the saved data defines an operation that a human user would use to perform the manual operation, and contains data that would otherwise be entered manually while performing the manual operation.

16. The system of claim 11, wherein the using the saved data to perform a manual operation includes using an open source 3270 terminal emulator.

17. The system of claim 11, wherein the operations further include:
  receiving data from a form in a webpage;
  validating the received data; and
  saving the validated data as the saved data.

18. The system of claim 11, wherein the manual operation includes logging into an application, navigating through specific screens via one or more of a mouse click or a keystroke, and entering the saved data into an area of functionality of the application.

19. The system of claim 11,
  wherein the determining the location to send the saved data includes acknowledging the service ticket and determining the determined location as a mainframe.

20. A non-transitory computer-readable medium storing instructions that, when executed by one or more processors, perform operations including:
  initiating, by a decisions workflow component, an API call through an API gateway connected to a production firewall to initiate a connection to an automation services component to process saved data, wherein the saved data has been validated;
  validating, by a service layer, the saved data;
  creating, by the automation services component using backend automation, a service ticket in a digital workflow component using the saved data;
  authenticating, by a service layer, the service ticket;
  determining, by the digital workflow component, based on the saved data and the service ticket, a location to send the saved data, wherein the determining the location to send the saved data includes determining whether the ticket is associated with one or more of adding, deleting, or reinstating a user;
  sending, by the digital workflow component, the saved data from the service ticket to the determined location; and
  using, by a terminal emulator, the saved data from the service ticket to automatically perform a manual operation that changes a component at the determined location.

* * * * *